3,333,925
STANNATE TYPE STABILIZER COMPOSITIONS AND PREPARATION THEREOF

James H. Young, Lewiston, N.Y., assignor to E. I. du Pont de Nemours and Company, Wilmington, Del., a corporation of Delaware
No Drawing. Filed May 13, 1964, Ser. No. 367,204
7 Claims. (Cl. 23—207.5)

This invention relates to compositions for stabilizing hydrogen peroxide, to their preparation and to their use for that purpose.

So called "stannate" type stabilizers, alone and more generally together with sodium pyrophosphate, have long been known and used as stabilizers for hydrogen peroxide solutions. In particular, they inhibit the decomposition of hydrogen peroxide which is catalyzed by the presence of iron compounds. They are less effective in stabilizing hydrogen peroxide against decomposition resulting from the presence of other decomposition catalysts such as copper compounds, and it is well known that the presence, e.g., as impurities, of compounds of more than one heavy metal greatly increases the problem of obtaining satisfactory stability in hydrogen peroxide solutions.

Much hydrogen peroxide is now produced and sold as concentrated aqueous solutions, e.g., solutions containing 70% or more $H_2O_2$ by weight. For most users, however, it is more convenient and safer to handle and store the peroxide in the form of more dilute solutions, e.g., as 35% or 50% solutions. This situation has led to a new and substantial demand for concentrated solutions which can be readily and safely diluted with water readily available at the user's mill to give stable solutions of such dilutions as are preferred for handling and storing at the mill.

Mill waters such as are readily available for diluting concentrated peroxide solutions are often quite contaminated with heavy metal compounds which actively catalyzed the decomposition of hydrogen peroxide. Indeed, some mill waters are so highly contaminated that when used to dilute 70% hydrogen peroxide solution to give 35% solutions, the latter may contain heavy metal compounds at concentrations, calculated as metals, approaching 1 mg. Fe, 0.2 mg. Cu, 0.1 mg. Mn and 0.02 mg. Cr per liter. Contaminations at such concentrations are about 10 times as high as were previously considered to be severe. Since severe contaminations result from dilutions with mill waters, some vendors of concentrated peroxide now provide, at substantial expense, special equipment and procedures for purifying mill waters prior to their use as diluents. The need for such purification is occasioned by the fact that previously known peroxide stabilizers would not adequately stabilize heavily contaminated peroxide solutions against losses due to decomposition and the attendant hazards.

Hydrogen peroxide decomposes exothermally and the rate increases as the temperature is increased. Thus, unless the heat of decomposition is dissipated as fast as it is generated, the temperature of the decomposing solution will increase progressively causing a progressive increase in the rate of decomposition. Thus, storage of heavily contaminated solutions can become quite hazardous and, of course, the peroxide lost through decomposition represents an economic loss. Heat balance calculations at various rates of decomposition indicate that the storage of peroxide solutions would be reasonably safe and economical when at rates of decomposition not exceeding about 1% per month at 25° C. At decomposition rates of about 2% per month or greater, heat is generated faster than it can be dissipated by radiation in warm weather and storage becomes hazardous. Storage tanks in the South in the summer frequently reach temperatures of 35° C. and higher so that storage of highly contaminated and inadequately stabilized solutions therein is neither practical nor safe.

It is an object of the invention to provide improved compositions for stabilizing such relatively highly contaminated hydrogen peroxide solutions. A further object is to provide a method of preparing such improved stabilizing compositions and peroxide solutions stabilized therewith. A particular object is to provide concentrated stabilized peroxide solutions which exhibit surprisingly good stability, even after being diluted with contaminated mill water. Still other objects will be apparent from the following description.

The objects of the invention are realized by a stabilizer composition comprising an aqueous solution of stannic acid and polystannic acid formed in situ from a sodium stannate solution, which aqueous solution also contains sodium pyrophosphate and a straight chain sodium polymetaphosphate of the formula $(NaPO_3)_x$ wherein $x$ represents from 12 to 17 monomer units; by the method described below for preparing such a composition; and by hydrogen peroxide solutions stabilized by the addition thereto of such a stabilizer composition.

The stabilizer composition is prepared by dissolving sodium stannate in water to give a solution containing 1 to 10% sodium stannate, $Na_2SnO_3 \cdot 3H_2O$. The sodium stannate is then converted in situ in the presence of a substantial but limited amount of either sodium pyrophosphate or a sodium polymetaphosphate of the above type to stannic acid, and the latter is partially polymerized in situ to polystannic acid. Preferably, the conversion is effected in the presence of both of these phosphates. The polystannic acid is then peptized or solubilized by the addition of further amounts of the pyrophosphate and/or polymetaphosphate and the pH of the resulting solution is finally adjusted, if necessary, to a value of lower than 8 but higher than 5, the preferred pH being 6 to 7.

The concentration of the original sodium stannate solution should not exceed about 10% $Na_2SnO_3 \cdot 3H_2O$, since higher concentrations yield stabilizer solutions which contain objectionable precipitates. Concentrations less than about 1% are generally undesirable because they give stabilizer solutions so dilute that they unduly dilute peroxide solutions to which they are added. Concentrations of from 2 to 7% are preferred.

The stabilizer solutions or compositions of the invenention contain both sodium pyrophosphate and a straight chain sodium polymetaphosphate of the formula $$(NaPO_3)_x$$

wherein x represents from 12 to 17, preferably 14 to 16, monomer units. The weight ratio of the sum of the amounts of these phosphates present to the sum of the amounts of stannic and polystannic acids (calculated as $Na_2SnO_3 \cdot 3H_2O$) present should be at least 0.9:1 and preferably 1:1 to 2:1. Smaller proportions of the phosphates result in solutions which gel or precipitate polystannic acid. Larger proportions of the phosphates up to the limits of their solubilities can be employed but result in no additional benefits.

It has been found that the presence of both of the above phosphates in the stabilizer composition is essential to the achievement of satisfactory results when the composition is used to stabilize severely contaminated peroxide. Although compositions containing the sodium polymetaphosphate as the only phosphate present are effective stabilizers, they gel readily and also produce cloudy peroxide solutions. On the other hand, compositions containing sodium pyrophosphate as the only phosphate are relatively poor stabilizers for severly contaminated peroxide solutions. It has been found to be essential that the above two phosphates be present at a weight ratio of sodium pyrophosphate ($Na_4P_2O_7 \cdot 10H_2O$) to sodium polymetaphosphate of from 1:4 to 3:1; the preferred ratios range from 1:1 to 1:3.

The stabilizer composition may be added in any desired amount to the peroxide solution which is to be stabilized. An amount giving a tin compound concentration as low as 0.5 mg. (calculated as $Na_2SnO_3 \cdot 3H_2O$) per liter will exert a worthwhile stabilizing effect, but concentrations of 5 to 300 mg. per liter will generally be used. For peroxide solutions of about 30 to 50%, amounts of the stabilizer composition giving around 100 to 150 mg. per liter are generally preferred. For stabilizing more concentrated peroxide solutions, e.g., 70%, which are intended to be diluted, e.g., at the user's mill, to a 30 to 50% solution, a correspondingly greater amount of the stabilizer concentration will generally be used so that, after dilution, the stabilizer concentration will be within the above preferred range for the 30 to 50% solutions. The concentrations of the above phosphates in the stabilized peroxide solution will of course be from 0.9 to 2 or more, preferably 1 to 2, times the concentration of the tin compounds, and the concentrations of the two phosphates relative to each other will, of course, be the same as in the stabilizer composition employed, unless further amounts of one or more of the phosphates are added separately to the peroxide.

The pH of the statbilized peroxide solution should generally be not higher than about pH 5, e.g., 0 to 5. The optimum pH will depend somewhat upon the $H_2O_2$ concentration in the peroxide solution. As noted in Elston U.S. Patent 2,497,814, the pH representing the so-called equivalence point of a peroxide solution varies with the peroxide concentration. In general, it is preferable to adjust, if necessary, the pH of the stabilized solution to approximately that pH representing the equivalence point of the peroxide solution. Any adjustment desired can be effected by the addition of any suitable acid such as nitric acid, phosphoric acid, sulfuric acid, lactic acid, citric acid or the like, or by the addition of any suitable alkali such as ammonium hydroxide, sodium hydroxide, potassium hydroxide or the like.

In preparing the stabilizer composition of the invention, it is important that the in situ conversion of the sodium stannate in the original stannate solution to stannic acid and the partial polymerization of the latter be effected in the presence of either sodium pyrophosphate or the above sodium polymetaphosphate, preferably both. In general, about 30 to 50% of the final total requirements of these phosphates (supplied as either one or both) should be present during this intermediate stage of the preparation. When both phosphates are present, it is preferred that their proportions relative to each other to be about the same in the intermediate stage as in the final stabilizer solution. The original sodium stannate solution generally will have a pH of about 12.3. After adding 30 to 50% of the phosphates required, the pH will generally be about 11.2 to 1.5. Conversion of the stannate to stannic acid with partial polymerization of the latter is then effected by adjusting the pH to about 10 to 8. Partial percipitation of polystannic acid begins at about pH 10. This precipitate is gradually repeptized by the phosphate anions, and at pH levels of about 7, also by the stannate anions. Addition of the remainder of the required phosphates then completely peptizes the polystannic acid and stabilizes it against precipitation or gellation. The pH of the composition is adjusted finally, e.g., by the addition of nitric acid to the preferred value of 6 to 7, although any value less than 8 but greater than 5 can be used. This technique for preparing the stabilizer composition is easily reproduced and leads to clear, stable and highly effective stabilizer compositions.

It has been found that in the above preparation, the intermediate partial precipitation of polystannic acid is highly important to the obtainment of maximum stabilizing effectiveness. It is, therefore, essential that acidification of the solution to effect such partial precipitation not be effected using an acid such as phosphoric acid whose anion inhibits such precipitation. Acids such as the hydrogen halides also will generally not be used since they introduce halide ions whose presence in the peroxide cause corrosion of the commonly used aluminum storage vessels. Sulfuric acid, spulfamic acid and strong acid cation exchange resins such as the acid form of the sulfonated copolymers of styrene and divinyl benzene, are examples of suitable acids which do not introduce objectionable anions. However, the preferred acid is nitric acid since its use results in the most effective stabilizers and its nitrate anions function to inhibit corrosion of aluminum vessels by the stabilized peroxide. The acids indicated above to be suitable for the intermediate pH adjustment can also be used for the final pH adjustment in preparing the stabilizer composition. Phosphoric acid can also be used at this point although nitric acid is again preferred.

The invention is illustrated by the following examples. In the examples and elsewhere in the specification all composition percentages are by weight.

*Example 1*

A solution having a pH of about 12.3 was prepared by dissolving 4 grams of sodium stannate ($Na_2SnO_3 \cdot 3H_2O$) in 100 ml. of distilled water. The solution had a pH of about 11.3 after dissolving therein one gram of sodium pyrophosphate ($Na_4P_2O_7 \cdot 10H_2O$) and one gram of a commercial straight chain sodium polymetaphosphate of the formula $(NaPO_3)_{14-16}$. Dilute (about 7%) nitric acid was added slowly to the agitated solution to reduce the pH thereof to about 8.5, after which one additional gram of each of the above phosphates was added. Nitric acid was again added to reduce the pH of the solution to 8.0 and another one gram increment of each of the phosphates was added, following which the pH of the solution was adjusted to 7 with dilute nitric acid. The solution was clear before the initial addition of nitric acid. The nitric acid additions to about pH 8 converted the sodium stannate to stannic acid and caused partial polymerization with precipitation of polystannic acid, resulting in a turbid solution. The precipitated polystannic acid was continuously peptized by the added phosphates and the final solution having a pH of 7 was clear. Such solutions remain clear for at least six months and do not give cloudy or hazy peroxide solutions such as often result when using prior stabilizer solutions containing metastable tin compounds resulting from heating or aging sodium stannate solutions.

A high purity 92% hydrogen peroxide solution was diluted to a 35% solution using water that had been deionized by passage through a mixed bed of anion and cation exchange resins. The above stabilizer composition was added to the 35% peroxide solution to give in the latter 117 mg. tin compounds (calculated as $Na_2SnO_3 \cdot 3H_2O$) per liter, 87 mg. sodium pyrophosphate ($Na_4P_2O_7 \cdot 10H_2O$) per liter and 87 mg. per liter sodium polymetaphosphate. A solution of 0.960 g.

$FeNH_4(SO_4)_2 \cdot 12H_2O$ 0.065 g. of $CuSO_4 \cdot 5H_2O$, 0.030 g. of $Cr_2(SO_4)_3 \cdot 18H_2O$ and 0.032 g. of $MnSO_4 \cdot H_2O$ in 100 ml. of water was added to the stabilized peroxide solution in an amount to give therein concentrations of the heavy metal compounds equal to 1.0 mg. Fe, 0.15 mg. Cu, 0.10 mg. Mn and 0.02 mg. Cr per liter. However, prior to the latter addition, ammonium nitrate was added to the peroxide solution in an amount equal to about 500 mg. per liter and sulfuric acid was added to adjust the pH to 3.8. The stability of the final stabilized and severely contaminated 35% peroxide solution was then determined by a gas evolution method in which the rate of gas evolution resulting from decomposition is measured after storage for various intervals of time at room temperature (24–27° C.). The results obtained are reported in Table 1 as test (a).

Table 1 also reports (tests (b) to (i)) results obtained with similarly contaminated 35% peroxide solutions stabilized by the addition thereto of other stabilizer compositions prepared in a manner generally similar to that described above. For comparison, the test (j) results are those for a corresponding unstabilized and uncontaminated peroxide solution, while the test (k) results are those for a corresponding unstabilized peroxide solution contaminated with 0.87 mg. Fe, 0.13 mg. Cu, 0.087 mg. Mn and 0.017 mg. Cr per liter. The peroxide solutions in tests (a) through (i) were contaminated with 1.0 mg. Fe, 0.15 mg. Cu, 0.10 mg. Mn and 0.02 mg. Cr per liter. All of the stabilized peroxide solutions for tests (a) through (i) remained clear through the test periods.

with stabilizer solutions prepared as described in Roth U.S. Patent 2,872,293, Baker U.S. Patent 2,904,517 and Meeker U.S. Patent 3,114,606. The stabilized solutions were then contaminated and the effectiveness of the stabilizers were tested, all as described in Example 1. The results are reported in Table 2.

TABLE 2.—EFFECTIVENESS OF PRIOR STABILIZERS IN CONTAMINATED 35% $H_2O_2$ AT ROOM TEMPERATURE

| Test | Stabilizer | Concentration, Milligrams Per Liter | | | Days Stored | | | | |
|---|---|---|---|---|---|---|---|---|---|
| | | $Na_2SnO_3 \cdot 3H_2O$ | $Na_4P_2O_7$ | $H_3PO_4$ | 1-3 | 6-10 | 10-20 | 20-30 | 30-40 |
| | | | | | Rate of Decomposition, Percent Active Oxygen Lost/Month | | | | |
| a | Z | 164 | 0 | 78 | 2.5 | 2.3 | 4.3 | | |
| b | Z | 158 | 0 | 74 | 4.0 | | 2.3 | 2.6 | 2.4 |
| c | Y | 116 | 116 | | 2.1 | 4.1 | 4.1 | 2.6 | |
| d | Y | 105 | 105 | | 2.7 | 2.2 | 2.9 | 1.8 | |
| e | X | 118 | 118 | | 2.5 | 2.7 | 2.1 | 2.3 | 2.4 |
| f | W | 120 | 250 | | 2.7 | 2.4 | 3.4 | 8.1 | |
| g | W | 120 | 250 | | 1.7 | 1.4 | 6.6 | | |
| h | W | 55 | 120 | | 1.7 | 2.9 | 2.3 | 2.3 | |

NOTE:
(1) Stabilizer Z was prepared substantially as described in Ex. 1 of Roth USP 2,872,293. Stabilizer Y was prepared substantially as described in Ex. 2 of Baker USP 2,904,517. Stabilizer X was prepared substantially as described in Ex. 1 of Baker USP 2,904,517. Stabilizer W was prepared substantially as described in Ex. 3 of Meeker USP 3,114,606, where the sodium pyrophosphate was not added until after the stannate had been partially polymerized by heating the solution for 1 hr. at 90–100° C.
(2) All of the stabilized peroxide solutions developed turbidity on standing. Both stabilizer solutions X and W gelled on standing.

It will be seen by comparing the results reported in Tables 1 and 2 that the stabilizers of the present invention were substantially more effective than those of the Roth, Baker and Meeker patents.

*Example 3*

As indicated previously, it is important in preparing

TABLE 1.—STABILIZER EFFECTIVENESS IN CONTAMINATED 35% $H_2O_2$ AT ROOM TEMPERATURE

| Test | Concentration, Milligrams Per Liter | | | Days Stored | | | | | | |
|---|---|---|---|---|---|---|---|---|---|---|
| | $Na_2SnO_3 \cdot 3H_2O$ | $Na_4P_2O_7 \cdot 10H_2O$ | $(NaPO_3)_{14-16}$ | 1-3 | 6-10 | 10-20 | 20-30 | 30-40 | 40-60 | 150-180 |
| | | | | Rate of Decomposition, Percent Active Oxygen Lost/Month | | | | | | |
| a | 117 | 87 | 87 | 0.20 | 0.14 | 0.45 | 0.90 | 0.82 | 0.82 | 0.46 |
| b | 127 | 31 | 92 | 0.10 | 0.17 | 0.54 | 0.73 | 0.90 | 1.00 | 0.75 |
| c | 109 | 55 | 55 | 0.10 | 0.36 | 0.82 | 0.73 | 0.86 | 0.73 | 0.61 |
| d | 125 | 67 | 67 | 0.14 | 0.18 | 0.55 | 0.69 | 0.64 | | 0.63 |
| e | 123 | 31 | 92 | 0.27 | 0.18 | 0.82 | 0.90 | 0.90 | | 0.83 |
| f | 123 | 31 | 92 | 0.18 | 0.25 | 0.72 | 0.73 | 1.10 | | 0.70 |
| g | 160 | 57 | 96 | 0.33 | 0.41 | 0.37 | 0.37 | 0.46 | | |
| h | 210 | 62 | 150 | 0.10 | 0.22 | 0.43 | 0.48 | 0.43 | | |
| i | 197 | 58 | 139 | 0.10 | 0.30 | 0.38 | 0.50 | 0.50 | | |
| j | None | None | None | 0.31 | | | | | | |
| k | None | None | None | 15.2 | | | | | | |

It will be seen from the results of Table 1 that the stabilizing compositions of the invention are highly effective in stabilizing peroxide severely contaminated with heavy metal compounds. Furthermore, they are effective during the initial periods of storage, which is highly advantageous to those customers who employ the peroxide shortly after it is diluted with mill water. Previously available stabilizers are generally significantly less effective during the early periods of storage and do not prevent dangerous autocatalytic heat buildup.

*Example 2*

Samples of 35% hydrogen peroxide were stabilized the present stabilizer compositions that the two phosphates be present in the final composition in certain proportions relative to each other. This is shown by the results reported in Table 3. The stabilizer compositions used were prepared and tested as generally described in Example 1 except that the relative proportions of the two phosphates were varied. The proportions used are indicated by the phosphate concentrations resulting in the peroxide solutions when the stabilizer concentrations were added to 35% hydrogen peroxide to give the stannate concentrations indicated in the Table. All peroxide samples were contaminated as described in Example 1 before testing.

may be added separately from the stabilizer composition to the peroxide solution.

TABLE 3.—EFFECT OF VARIED RATIOS OF PHOSPHATES

| Test | Concentration, Milligrams Per Liter | | | Days Stored | Rate of Decomp., Percent/ Month |
|---|---|---|---|---|---|
| | $Na_2SnO_3 \cdot 3H_2O$ | $Na_4P_2O_7 \cdot 10H_2O$ | $(NaPO_3)_{14-16}$ | | |
| a | 121 | 121 | None | 4 | 1.92 |
| b | 121 | 121 | None | 7 | 2.40 |
| c | 120 | 91 | 28 | 3 | 0.38 |
| d | 120 | 91 | 28 | 4 | 0.42 |
| e | 129 | 33 | 33 | 4 | 0.33 |
| f | 109 | 55 | 55 | 3 | 0.10 |
| g | 123 | 31 | 92 | 3 | 0.10 |
| h | 117 | 87 | 87 | 3 | 0.10 |
| i | 119 | None | 119 | 3 | 0.27 |
| j | 75 | None | 75 | 3 | 0.36 |

NOTE.—The sodium pyrophosphate-free stabilizer compositions used in tests (i) and (j) gelled on standing and gave cloudy peroxide solutions when used.

*Example 4*

A number of stabilizer compositions were prepared following generally the procedure of Example 1 but employing sodium pyrophosphate either as the only phosphate or in combination with various other phosphates. The compositions were then used to stabilize 35% hydrogen peroxide, the stabilized peroxide solutions were contaminated, and the stabilized and contaminated peroxide solutions were tested, all generally as described in Example 1. The results obtained are shown in Table 4.

TABLE 4.—EFFECT OF USING VARIOUS PHOSPHATES

| Test | Concentration, Milligrams Per Liter | | | | Days Stored | Decomp., Percent/ Month |
|---|---|---|---|---|---|---|
| | $Na_2SnO_3 \cdot 3H_2O$ | $Na_4P_2O_7 \cdot 10H_2O$ | $(NaPO_3)_{14-16}$ | Other Na Phosphate | | |
| a | 180 | 90 | | 90 trimeta | 4 | 2.9 |
| b | 200 | 72 | | 130 tetrameta | 2 | 2.3 |
| c | 195 | 59 | | 143 $NaH_2PO_4$ | 2 | 13.3 |
| d | 182 | 75 | | 107 tripoly | 3 | 4.1 |
| e | 116 | 23 | | 78 $(NaPO_3)_{5-7}$ | 3 | 1.9 |
| f | 141 | 141 | | | 2 | 2.4 |
| g | 123 | 31 | 92 | | 3 | 0.10 |
| h | 125 | 67 | 67 | | 3 | 0.14 |

It is clear from the above results that the combination of sodium pyrophosphate and $(NaPO_3)_{14-16}$ gives distinctly better stabilization than does pyrophosphate alone or with other phosphates.

The above examples show the outstanding effectiveness of the stabilizer compositions of the invention in stabilizing severely contaminated 35% hydrogen peroxide solutions. They are similarly effective and are useful in stabilizing more dilute and more concentrated peroxide solutions whether or not they are severely contaminated. However, because of their high effectiveness in stabilizing severely contaminated solutions, they are especially useful for stabilizing relatively concentrated, e.g., 70% peroxide solutions which are intended to be diluted with mill water to 30–50% strengths for storage and use at the mill.

As is well known, the presence of a nitrate such as sodium or ammonium nitrate inhibits the corrosion of aluminum by hydogen peroxide solutions and the addition of a nitrate for that purpose is widely practiced since aluminum containers and storage vessels are commonly used. Such nitrates do not affect the stabilizer compositions of the invention and if their presence is desired, they may be added during or after the preparation thereof, or they

I claim:
1. The method of preparing a composition for stabilizing hydrogen peroxide comprising the steps of:
 (I) preparing an aqueous solution of sodium stannate, $Na_2SnO_3 \cdot 3H_2O$, and at least one phosphate of the group consisting of sodium pyrophosphate,

$$Na_4P_2O_7 \cdot 10H_2O$$

and a straight chain sodium polymetaphosphate of the formula $(NaPO_3)_x$ wherein $x$ represents from 12 to 17 monomer units,
 (II) acidifying said solution to a pH of from 10 to 8 by the addition thereto of an acid of the group consisting of nitric acid, sulfuric acid, sulfamic acid and an acid sulfonated copolymer of styrene and divinyl benzene, whereby said sodium stannate is converted to stannic acid and partially precipitated as polystannic acid, and
 (III) adding to the resulting solution at least one phosphate from said group of phosphates and thereafter adjusting the pH of the solution to a pH lower than 8 but higher than 5, whereby there is obtained a clear product solution containing stannic and polystannic acids, sodium pyrophosphate and said sodium polymetaphosphate,
  (a) said product solution having a stannic and polystannic acids content, calculated as $$Na_2SnO_3 \cdot 3H_2O$$

of 1 to 10% and a total phosphate content such that the weight ratio of said total phosphate content to said acids content is 0.9:1 to 2:1 and containing said sodium pyrophosphate and said sodium polymetaphosphate at a weight ratio of from 1:4 to 3:1;

(b) said at least one phosphate in each of steps (I) and (III) being so chosen and employed in such amounts that the total phosphate content of the solution resulting from step (I) is 30 to 50% of the total phosphate content of the product solution of step (III) and the weight ratio of sodium pyrophosphate to sodium polymetaphosphate in said product solution is from 1:4 to 3:1.

2. The method of claim 1 wherein the weight ratio of the total phosphate content to the stannic and polystannic acids content in the product solution is from 1:1 to 2:1 and the weight ratio therein of sodium pyrophosphate to sodium polymetaphosphate is from 1:1 to 1:3.

3. The method of claim 1 wherein all pH adjustments are made using nitric acid.

4. A composition for stabilizing hydrogen peroxide consisting essentially of a clear solution in water of stannic and polystannic acids, sodium pyrophosphate and sodium polymetaphosphate of the formula $(NaPO_3)_x$ wherein $x$ represents from 12 to 17 polymer units, said solution having a stannic and polystannic acids content, calculated as $Na_2SnO_3 \cdot 3H_2O$, of 1 to 10% and a total phosphate content such that the weight ratio of said total phosphate content to said acids content is 0.9:1 to 2:1 and containing said sodium pyrophosphate and said sodium polymetaphosphate at a weight ratio of sodium polyphosphate, calculated as $Na_4P_2O_7 \cdot 10H_2O$, to sodium polymetaphosphate of from 1:4 to 3:1, the pH of said solution being lower than 8 but higher than 5.

5. A composition according to claim 4 wherein the weight ratio of the total phosphate content to the stannic and polystannic acids content is from 1:1 to 2:1, the weight ratio of sodium pyrophosphate to sodium polymetaphosphate is from 1:1 to 3:1, and the pH of the solution is about 6 to 7.

6. A composition comprising an aqueous hydrogen peroxide solution having a pH of 0 to 5 to which has been added such an amount of a stabilizer composition as to provide therein stannic and polystannic acids at a concentration, calculated as $Na_2SnO_3 \cdot 3H_2O$, of from 0.5 to 300 mg. per liter, said stabilizer composition consisting essentially of a clear solution in water of stannic and polystannic acids, sodium pyrophosphate and sodium polymetaphosphate of the formula $(NaPO_3)_x$ wherein $x$ represents from 12 to 17 polymer units, said stabilizer composition having a stannic and polystannic acids content, calculated as $Na_2SnO_3 \cdot 3H_2O$, of 1 to 10% and a total phosphate content such that the weight ratio of said total phosphate content to said acids content is 0.9:1 to 2:1 and containing said sodium pyrophosphate and said sodium polymetaphosphate at a weight ratio of sodium pyrophosphate, calculated as $Na_4P_2O_7 \cdot 10H_2O$, to sodium polymetaphosphate of from 1:4 to 3:1, the pH of said stabilizer composition being lower than 8 but higher than 5.

7. A composition comprising an aqueous hydrogen peroxide solution having a pH of 0 to 5 to which has been added such an amount of a stabilizer composition as to provide therein stannic and polystannic acids at a concentration, calculated as $Na_2SnO_3 \cdot 3H_2O$, of from 0.5 to 300 mg. per liter, said stabilizer composition consisting essentially of a clear solution in water of stannic and polystannic acids, sodium pyrophosphate and sodium polymetaphosphate of the formula $(NaPO_3)_x$ wherein $x$ represents from 12 to 17 polymer units, said stabilizer composition having a stannic and polystannic acids content, calculated as $Na_2SnO_3 \cdot 3H_2O$, of 1 to 10% and a total phosphate content such that the weight ratio of said total phosphate content to said acids content is 1:1 to 2:1 and containing said sodium pyrophosphate and said sodium polymetaphosphate at a weight ratio of sodium pyrophosphate, calculated as $Na_4P_2O_7 \cdot 10H_2O$, to sodium polymetaphosphate of from 1:1 to 3:1, the pH of said stabilizer composition being about 6 to 7.

References Cited

UNITED STATES PATENTS 2,904,517    9/1959    Baker _____ 23—207.5
3,114,606    12/1963    Meeker _____ 23—207.5

FOREIGN PATENTS 409,361    4/1934    Great Britain.

OSCAR R. VERTIZ, *Primary Examiner.*

MILTON WEISSMAN, *Examiner.*

H. S. MILLER, *Assistant Examiner.*